US007282292B2

(12) United States Patent
Cortright et al.

(10) Patent No.: US 7,282,292 B2
(45) Date of Patent: Oct. 16, 2007

(54) FUEL CELL STACK ASSEMBLY

(75) Inventors: Jeffrey Earl Cortright, Corning, NY (US); Phong Diep, Newfield, NY (US); Scott Christopher Pollard, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/288,885

(22) Filed: Nov. 28, 2005

(65) Prior Publication Data

US 2006/0141332 A1 Jun. 29, 2006

Related U.S. Application Data

(60) Provisional application No. 60/632,042, filed on Nov. 30, 2004.

(51) Int. Cl.
*H01M 8/00* (2006.01)
(52) U.S. Cl. .............................. 429/34; 429/30; 429/36
(58) Field of Classification Search ................. 429/13, 429/30, 32, 34, 36, 38
See application file for complete search history.

(56) References Cited

U.S. PATENT DOCUMENTS

| 5,085,455 | A | 2/1992 | Bogner et al. ............. 280/618 |
| 5,273,837 | A | 12/1993 | Aitken et al. ................ 429/30 |
| 5,416,057 | A | 5/1995 | Lipp et al. .................. 502/439 |
| 5,486,428 | A | 1/1996 | Gardner et al. .............. 429/19 |
| 6,194,095 | B1 | 2/2001 | Hockaday ..................... 429/34 |
| 7,001,684 | B2* | 2/2006 | Doshi et al. .................. 429/34 |
| 2001/0044041 | A1 | 11/2001 | Badding et al. ............. 429/32 |
| 2002/0102450 | A1 | 8/2002 | Badding et al. ............. 429/32 |
| 2003/0096147 | A1 | 5/2003 | Badding et al. ............. 429/30 |
| 2006/0166053 | A1* | 7/2006 | Badding et al. ............. 429/13 |

OTHER PUBLICATIONS

Matsuzaki et al; "Electrochemical properties of a SOFC cathode in contact with a chromium-containing alloy separator", Solid State Ionics 132 (2000) 271-278.

* cited by examiner

*Primary Examiner*—Patrick Joseph Ryan
*Assistant Examiner*—Monique Wills
(74) *Attorney, Agent, or Firm*—Svetlana Z. Short

(57) ABSTRACT

An exemplary fuel cell device assembly is a fuel cell stack assembly comprising: (i) a plurality of fuel cell packets, each of the packets comprising (a) a frame and (b) two planar electrolyte-supported fuel cell arrays, the fuel cell arrays arranged such that anode side of one fuel cell array faces the anode side of another fuel cell array, and the frame in combination with the fuel cell arrays defines a fuel chamber; (ii) a main enclosure enclosing the plurality of fuel cell packets, such that the plurality of packets form a plurality of oxidant channels; (iii) a restrictor plate forming, in conjunction with the fuel cell pockets, a plurality of oxidant channels; (iv) an inlet oxidant plenum manifold connected to one side of the oxidant channels; (v) an outlet oxidant plenum manifold connected to the other side of the oxidant channels; (vi) an inlet fuel manifold connected to one side of each of the fuel chambers; and (vii) an outlet fuel manifold connected to the other side of each of the fuel chambers.

7 Claims, 8 Drawing Sheets

FUEL CELL STACK ASSEMBLY

This application claims the benefit of priority under 35 U.S.C. § 119(e) of U.S. Provisional Application Ser. No. 60/632,042 filed on Nov. 30, 2004.

BACKGROUND OF THE INVENTION

1. Field of the Invention

The present invention relates generally to fuel cell stacks incorporating multiple fuel cell arrays.

2. Technical Background

The use of solid oxide fuel cells has been the subject of considerable amount of research in recent years. The typical components of a solid oxide fuel cell (SOFC) comprise a negatively-charged oxygen-ion conducting electrolyte sandwiched between two electrodes. Electrical current is generated in such cells by oxidation, at the anode, of a fuel material, for example hydrogen, which reacts with oxygen ions conducted through the electrolyte. Oxygen ions are formed by reduction of molecular oxygen at the cathode.

US Patent Publication US2002/0102450 and 2001/0044041 describe solid electrolyte fuel cells which include an improved electrode-electrolyte structure. This structure comprises a solid electrolyte sheet incorporating a plurality of positive and negative electrodes, bonded to opposite sides of a thin flexible inorganic electrolyte sheet. One example illustrates that the electrodes do not form continuous layers on electrolyte sheets, but instead define multiple discrete regions or bands. These regions are electronically connected, by means of electrical conductors in contact therewith that extend through vias in the electrolyte sheet. The vias are filled with electronically conductive materials (via interconnects).

U.S. Pat. No. 5,085,455 discloses thin, smooth inorganic sintered sheets. The disclosed sintered sheets have strength and flexibility to permit bending without breaking as well as excellent stability over a wide range of temperatures. Some of the disclosed compositions, such as yttria stabilized zirconia YSZ ($Y_2O_3$—$ZrO_2$) would be useful as electrolytes for fuel cells. It is known that at sufficient temperatures (e.g., about 725° C. and above), zirconia electrolytes exhibit good ionic conductance and very low electronic conductance. U.S. Pat. No. 5,273,837 describes the use of such compositions to form thermal shock resistant solid oxide fuel cells.

US Patent Publication US2001/0044043 describes solid electrolyte fuel cells utilizing substantially planar, smooth electrolyte sheet with a roughened interface surface layer. This publication discloses electrolyte sheet thickness below 45 micrometers. The ceramic electrolyte sheet is flexible at such thicknesses.

It is known that substrate type solid oxide fuel cells sometimes utilize metal alloys as separators. Such configuration is described, for example, in the article entitled "Electrochemical properties of a SOFC cathode in contact with a chromium-containing alloy separator", by Yoshido Matsuzaki and Isami Yasuda, Solid state Ionics 132 (2000) 271-278.

Solid oxide fuel cells may also be supported by a porous support structure, as disclosed for example in U.S. Pat. No. 5,486,428. Inside the porous support structure are sealed corrugated ceramic plates that form passages for either oxygen or fuel. More specifically, U.S. Pat. No. 5,486,428 discloses fuel cell modules, each having a porous substrate supporting a plurality of electrodes. An electrolyte layer is situated over these electrodes and another electrode layer is situated on the electrolyte layer. The porous support structure forms an integrated whole with these layers and is inseparable from these layers. The patent discloses that the fuel cell layers are directly bonded to the porous support structure, therefore fabrication constraints limit fuel cell configuration. For example, the cell layers are generally fired at different temperatures. Typically the anode and electrolyte are sintered at temperatures of 1400° C. or higher, whereas the cathode is ideally sintered at a temperature of 1200° C. or lower. Hence the fuel cell layers must be deposited in decreasing order of firing temperatures. However, it would be advantageous to be able to have other design configurations of the fuel cell arrays, without concern for the fabrication constraints. Furthermore, the porous support structure is relatively thick, and therefore, expensive to make. U.S. Pat. No. 6,194,095 discloses fuel cell stacks containing fuel cell arrays formed on an electrolyte impregnated porous plastic dielectric sheets with the cell to cell electrical interconnections made through the electrolyte membrane. The disclosed design utilizes air flow manifold units as well as fuel manifold units assembled between the fuel cell arrays. Having additional air and fuel manifold units and assembling them between the fuel cell arrays increases the complexity and the cost of the fuel cell stack.

U.S. Pat. No. 5,416,057 discloses a coated alternating heat exchanger device and a method of making such. The heat exchanger comprises a plurality of passages situated within a ceramic body. This patent does not disclose the use of this device in fuel cell applications.

SUMMARY OF THE INVENTION

One aspect of the invention is a fuel cell stack assembly comprising: (i) a plurality of fuel cell packets, each of the packets comprising (a) a frame and (b) two planar electrolyte-supported fuel cell arrays, the fuel cell arrays arranged such that anode side of one fuel cell array faces the anode side of another fuel cell array, and the frame in combination with the fuel cell arrays defines a fuel chamber; (ii) a main enclosure enclosing the plurality of packets, such that the plurality of packets form a plurality of oxidant channels; (iii) at least one restrictor plate forming, in conjunction with the plurality of packets, the plurality of oxidant channels; (iv) an inlet oxidant plenum manifold connected to one side of the oxidant channels; (v) an outlet oxidant plenum manifold connected to the other side of the oxidant channels; (vi) an inlet fuel manifold connected to one side of each of the fuel chambers; and (vii) an outlet fuel manifold connected to the other side of each of the fuel chambers.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1A:
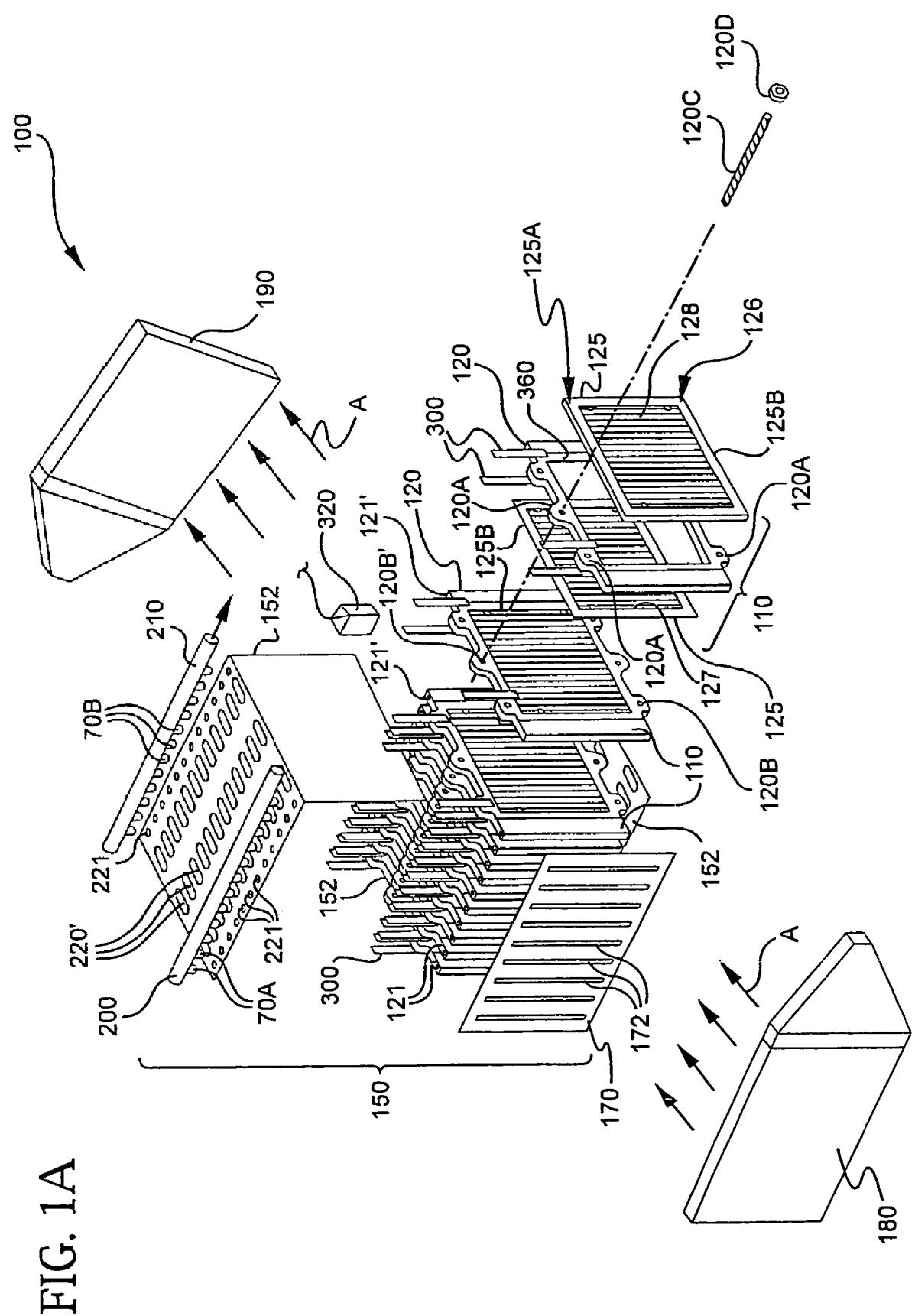
FIG. 1A is a schematic illustration of an exploded view of one embodiment of the fuel cell stack.

Reference will now be made in detail to the present preferred embodiments of the invention, examples of which are illustrated in the accompanying drawings. Whenever possible, the same reference numerals will be used throughout the drawings to refer to the same or like parts.

Figure 1B:
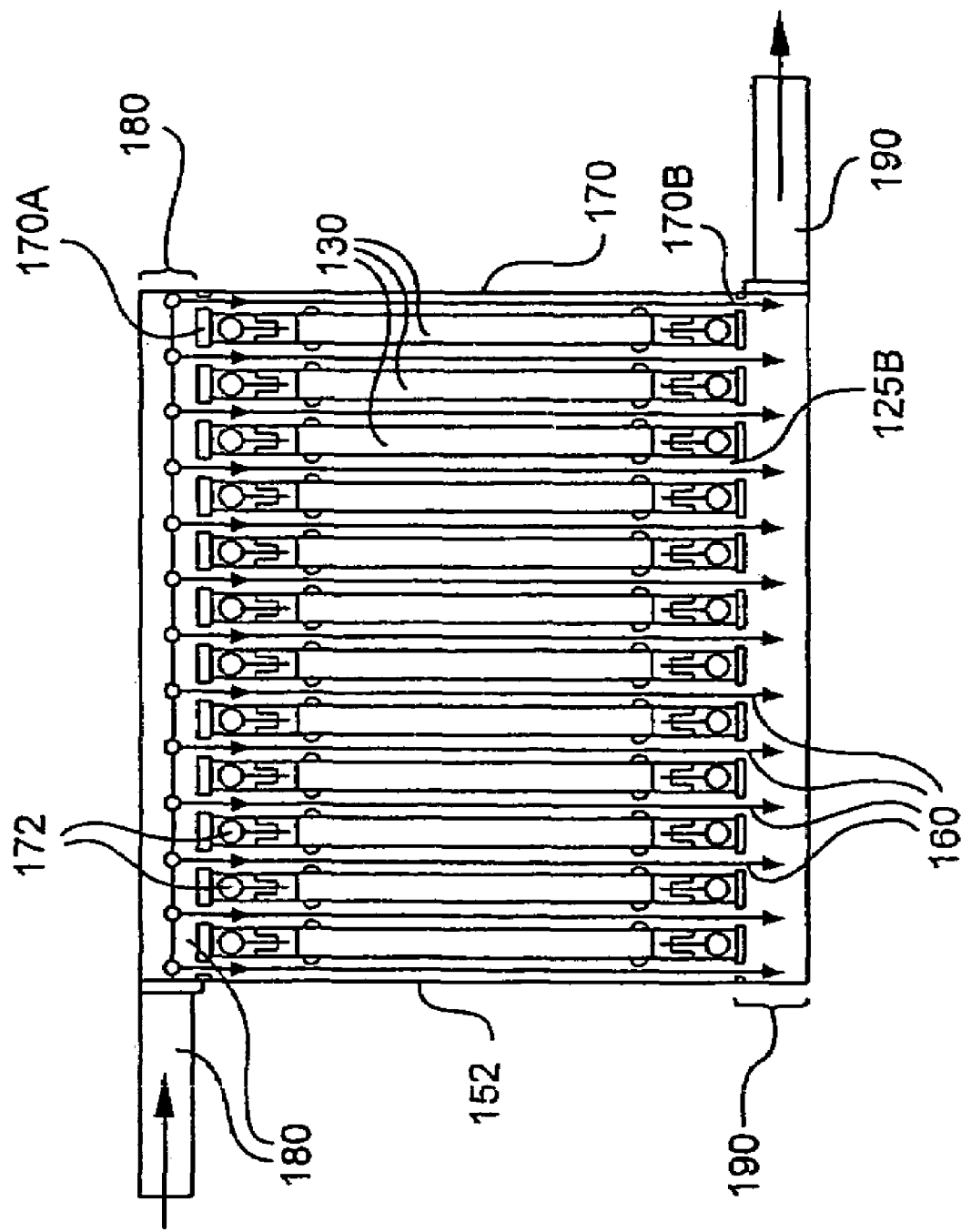
FIG. 1B is a schematic cross-sectional view of one embodiment of the fuel cell stack of FIG. 1A.

One embodiment of the present invention is shown in FIGS. 1A and 1B, and is designated generally throughout by the reference numeral 100. FIG. 1A is a schematic illustration of an exploded view of the fuel cell stack assembly 100. FIG. 1B is a schematic cross-sectional view of one embodiment of the fuel cell stack assembly depicted in FIG. 1A. FIG. 1A also illustrates an exploded view of a fuel cell packet 110. More specifically, FIG. 1A illustrates a fuel cell stack assembly 100 that utilizes a planar SOFC (solid oxide fuel cell) stack design that incorporates isolated individual fuel chambers situated inside the packets 110 and formed between pairs of fuel cell arrays. FIG. 2 is a perspective view of one fuel cell packet 110 utilized in the fuel cell stack of FIG. 1A.

The embodiment of the fuel cell stack assembly 100 of FIGS. 1A and 1B comprises a main enclosure enclosing a plurality of fuel cell packets 110. Each fuel cell packet 110 includes: (a) a packet frame 120 including alignment fixtures 120A containing side holes 120B and a central hole 120B' for through-bolt 120C (only one shown for ease of representation) and packet frame fuel inlet and exhaust openings 121, 121'; and (b) two planar electrolyte-supported fuel cell arrays 125 each comprising an electrolyte sheet and a plurality of electrodes arranged on both sides of the electrolyte sheet. A set of nuts 120D engages the bolt 120C, applying compressive force and holding the packets in their respective positions. The fuel cell arrays 125 are arranged such that anode side 125A of one fuel cell array 125 faces the anode side 125A of another fuel cell array 125. The packet frame 120, in combination with the two fuel cell arrays 125 forms the fuel chamber 130.

In this embodiment the main enclosure 150 comprises two L-shaped panels (endplates) 152, forming the walls of the oxidant (e.g., air) chamber 155. The main enclosure 150 encloses the plurality of cell packets 110 within an oxidant chamber 155, such that the plurality of packets 110 form a plurality of oxidant channels 160. The L-shaped panels 152 also contain alignment slots 220' for engaging the fuel cell packets in the proper positions and fuel packet tube holes 221 to allow for fuel provision into the fuel chambers 130 situated inside the fuel cell packets 110. The main enclosure 150 also contains at least one and preferably two removable restrictor plate(s) 170. The restrictor plates 170A, 170B, form the sidewalls of the main enclosure and, therefore, in conjunction with the L-shaped panels (endplates) 152 form the oxidant chamber 155. The restrictor plate 170A, 170B, contains a plurality of slots 172, each corresponding to their respective oxidant channel 160. Thus, in this embodiment, restrictor plates, in conjunction with the rest of the main enclosure 150, form the plurality of oxidant channels 160 situated inside the air chamber 155.

The fuel cell stack assembly 100 of FIGS. 1A and 1B further comprises inlet and outlet oxidant manifolds 180, 190, and inlet and outlet fuel manifolds 200, 210. The packets 110 are operatively connected to the inlet oxidant manifold 180 and the outlet oxidant manifold 190 such that the oxidant flows directly from the inlet manifold 180 between the fuel cell packets 110 and enters the outlet oxidant plenum manifold 190. The inlet oxidant plenum manifold 180 is situated adjacent to the removable restrictor plate 170 and is operatively connected to the inlet side of each of the oxidant channels 160. The inlet oxidant manifold 180 provides the oxidant (flowing in the direction of arrows A) through the restrictor plate slots 172 of the restrictor plate 170 to the oxidant channels 160 formed by the fuel cell packets 110. The oxidant (inlet) restriction plate 70A builds pressure in oxidant inlet manifold 180 to evenly distribute oxidant down the length L of the fuel cell stack assembly. The optional outlet oxidant restrictor plate 170B is used for controlling the pressure inside the oxidant channels 160. Thus, the oxidant flows into the main enclosure 155 through inlet oxidant manifold 180 and removable restrictor plate 170, entering the oxidant channels 160. The outlet plenum manifold 190 is operatively connected to the other side (exit side) of each of the oxidant channels 160. If a second restrictor plate 170 (not shown) is utilized to control the oxidant flow out of the channels 160, the oxidant continues to flow through the second restrictor plate 170B (located on the exit side of the oxidant channels 160) and exits through outlet manifold plenum 190 which will be situated adjacent to this second restrictor plate 170.

The inlet fuel manifold 200 is adjacent to the top section of the L-shaped endplate 152 and is connected through the fuel manifold inlet tubes 70A to the packet frames' inlet openings 121 to each of the fuel chambers 130 (situated inside the fuel cell packets 110). The connection tubes (outlet tubes) 70B of the outlet fuel manifold 210 are connected to the other (exhaust fuel side) side of each of the fuel chambers 130, through frame exhaust openings 121'.

Fuel, for use with the fuel cell device assembly 100, is fed towards the frames 120, for example, through gas distributing inlet tubes 70A which are sealed to the packet frames 120 with a weld or an appropriate seal material (not shown). The packet frame 120 of this embodiment contains inlet and exhaust openings 121, 121'. More specifically, the fuel passes (see direction of arrows) from the inlet fuel manifold 200, through the gas distributing inlet tubes 70A, into the inlet frame openings 121 of the packet frames 120, and then through the frames 120 to the fuel chambers 130 (anode chamber, formed by the two electrolyte sheets) via internal fuel distribution nozzles 122 (shown in FIG. 2B). The exhausted fuel passes from the fuel chambers 130 to the internal fuel distribution nozzles 122 of the frames 120 to the frame exhaust openings 121', and is exhausted into the outlet fuel manifold 210 via connection tubes 70B.

Inlet tubes 70A are sized to fit directly into the frame opening hole 121. Similarly, outlet tubes 70B are sized to fit directly into the frame exhaust hole 121'. In this embodiment tubes 70A, 70B have a higher thermal expansion than that of the framing material, forming a hermetic seal at high temperatures (operating temperatures of the fuel cell stack). This seal may also be augmented with another sealing material.

The oxidant and fuel flows described above are co-propagating because oxidant flow and fuel flow are moving along the same direction through/along the packets 110. Other embodiments may utilize counter flowing oxidant and fuel flow directions as well as cross flowing oxidant and fuel flow directions.

Figure 1C:
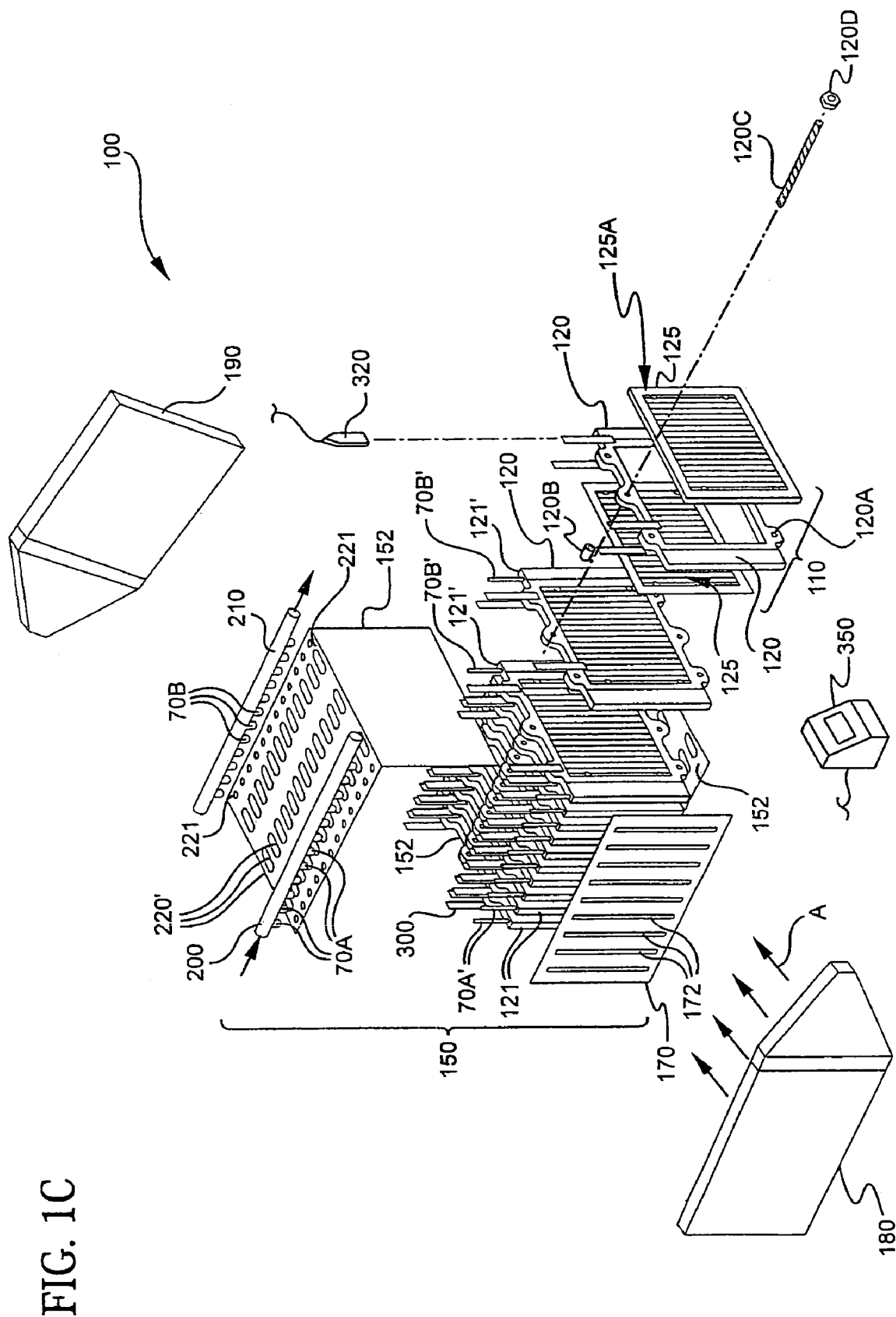
FIG. 1C is a schematic illustration of an exploded view of another embodiment of the fuel cell stack.

Alternatively, the inlet fuel manifold 200 may be connected to the packet frames' inlet openings 121 of each of the fuel chambers 130 by utilizing optional fuel inlet packet tubes 70A' which engage fuel manifold inlet tubes 70A. (This is shown in FIG. 1C) This embodiment also utilizes the fuel outlet packet tubes 70B' extending from each of the packets 110 and engaging the connection tubes 70B to achieve the connection between the outlet fuel manifold 210 and each packet 110. In this embodiment, the fuel flows into the main enclosure through the inlet fuel manifold 200, manifold inlet tubes 70A and fuel inlet packet tubes 70A' and enters the fuel chambers 130'. The fuel then continues to flow through outlet packet tubes 70B', manifold outlet tubes 70B and enters the exhaust (outlet) fuel manifold 210.

In the embodiment shown in FIG. 1C fuel is provided to fuel cell packets 110 via fuel manifold 200 and tube 70A. Coupling of tube 70A to fuel cell packets 110 via fuel inlet packet tube 70A' or tube 70B to fuel cell packets 110 via fuel outlet packet tube 70B' is accomplished in several different ways described below. There are several ways of connecting tubes 70A and 70B to tubes 70A', 70B', and of sealing this connection, some examples of which are described below.

Figure 3A:
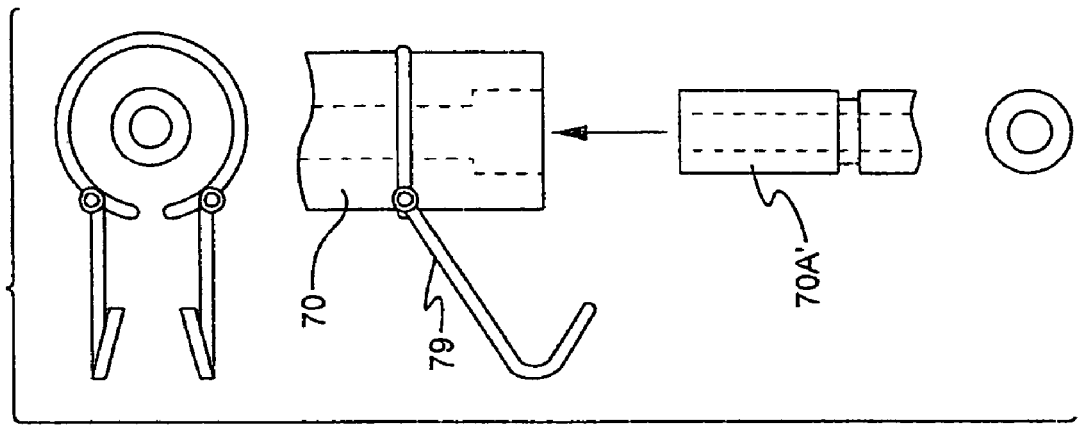
FIGS. 3A-3C illustrate schematically various exemplary connections between packet tubes and manifold tubes.

In one embodiment, tubes 70A and 70B have a larger outside diameter than that of tubes 70A', 70B' and have inside diameters sized to accepts tubes 70A', 70B', such that there is a slip fit between the tubes 70A, 70B and the tube 70A', 70B'. In addition, a mechanical clamp 79 keeps tubes 70A attached to tubes 70A' and tubes 70B attached to tubes 70B'. This is illustrated in FIG. 3A which shows tube 70A' that fits inside tube 70A. Alternatively, instead of using the mechanical clamp 79, a glass seal, braze or another appropriate seal may be utilized to hold and seal the connecting tubes together.

Figure 3C:
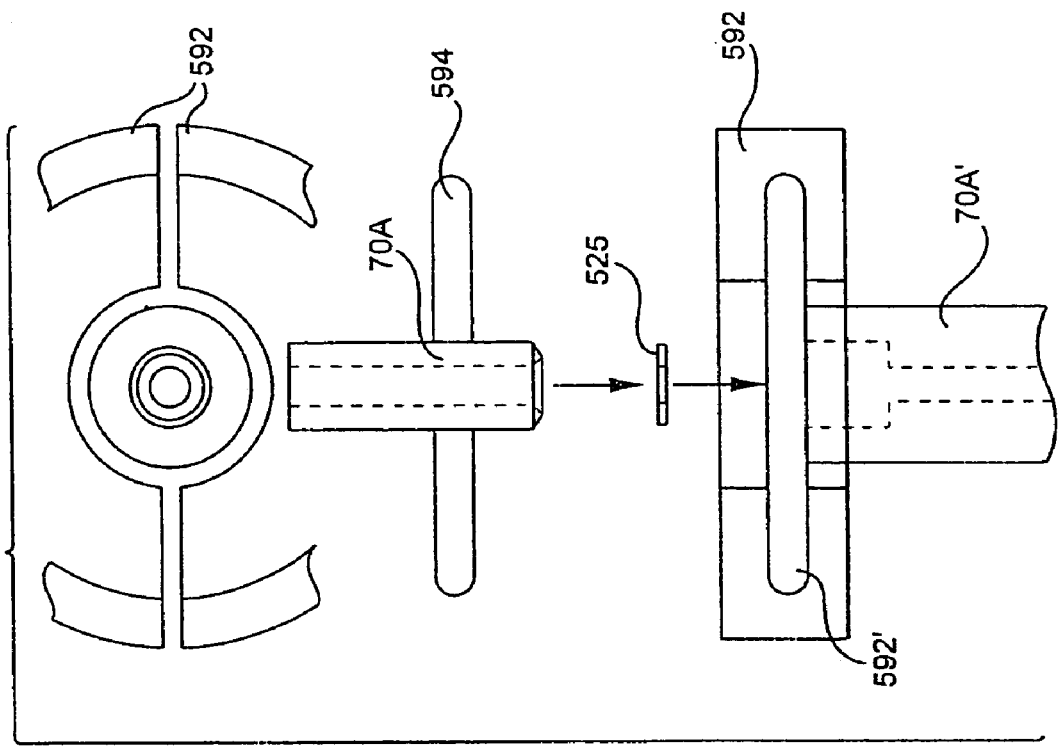
Figure 3B:
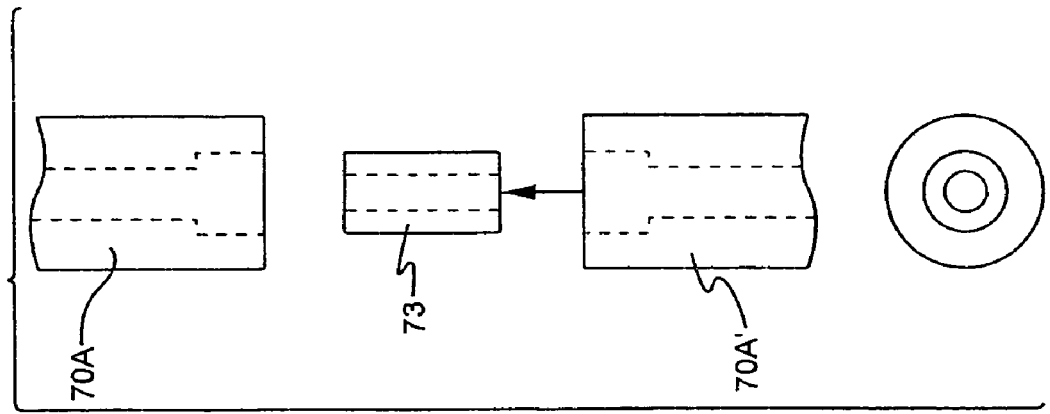

In another embodiment tubes 70A and 70A' (and tubes 70B and 70B') are both manufactured of material of substantially the same thermal expansion and have identical machined inside diameters. Both tubes 70A and 70A' and accept a plug tube 73 of a machined outside diameter that closely fits inside the tubes 70A, 70A'. The plug tube 73 is made of a higher thermal expansion material, such that when the fuel cell stack assembly is heated, plug tube 73 expands in size more than tubes 70A and 70A' (or tubes 70B and 70B'), forming a gas tight seal. This is illustrated in FIG. 3B.

Alternatively, a seal material may be used, such that a compression seal is formed when tubes 70A, 70B are coupled to 70A', 70B'. For example, the tubes 70A, 70B may be machined with the machined outside diameter terminating in a knife edge. These tubes may be coupled, respectively to tubes 70A', 70B' having a machined inside diameter terminating in a flat edge, such that there is a slip fit between tubes 70A and 70A', and between tubes 70B and 70B'. A soft metal washer 525 may be inserted into the tubes 70A', 70B' counter bore flange. A gas tight seal is made when the knife edge is compressed into the soft metal washer 525. (See FIG. 3C). The knife edge is compressed into the soft metal washer 525 by inserting disk 594 into the hollow area 592' of the half clamshell 592 and then attaching the other half of the half clamshell (not shown) such that when the tube 70A and the disc 594 are rotated, they force the knife edge into the washer 525.

The tubes 70A, 70B may also be coupled to the inlet tube 70A', 70B' using a Swagelok type fitting. Alternatively, the tubes 70A and 70A' of the same inside and outside diameter and may be butt sealed to one another.

In another embodiment, the tubes 70A and 70A', 70 B and 70B' have the same inside diameters and the same outside diameters. A sleeve of inside diameter larger than that of the outside diameter of tubes 70A or 70A' (70A or 70A') slip fits over tubes so that tubes 70A and 70A', 70B and 70B' couple to one another. The sleeve ends are sealed. This approach can be used in either hot or cold connection couplings depending on the braze temperature. For example, a braze temperature can be as high as 700° C.

Figure 2A:
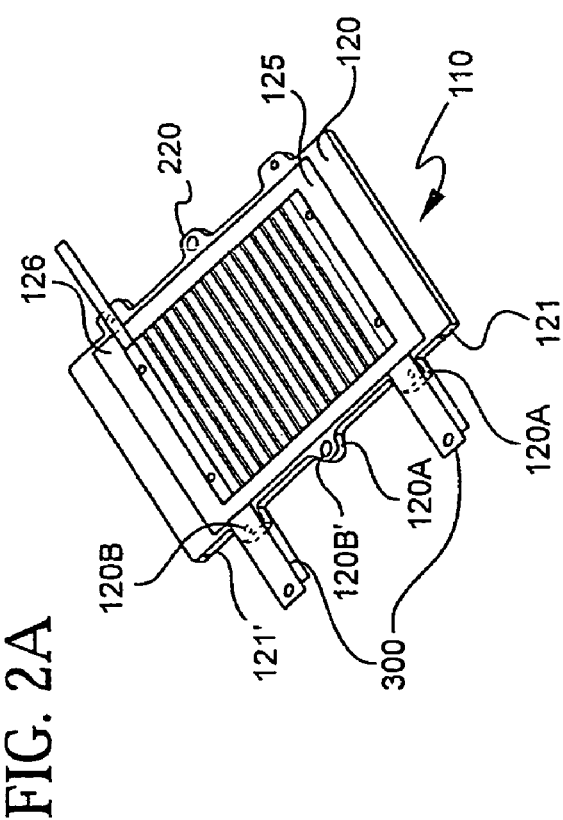
FIG. 2A is a perspective view of one fuel cell packet utilized in the fuel cell stack of FIGS. 1A and 1C.
Figure 2B:
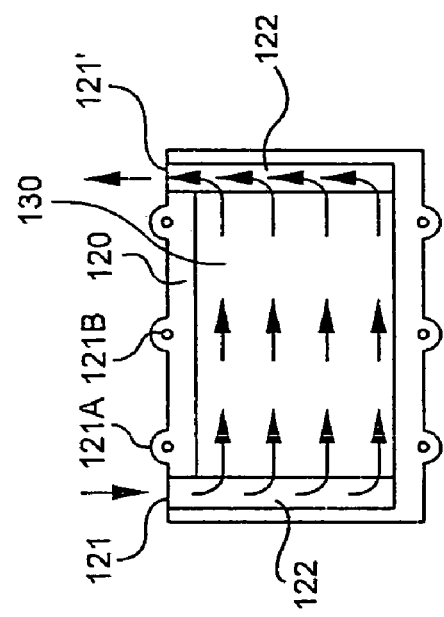
FIG. 2B is a schematic cross-sectional view of a fuel cell packet of FIG. 2A including a packet frame with an internal fuel distribution nozzle.
Figure 5:
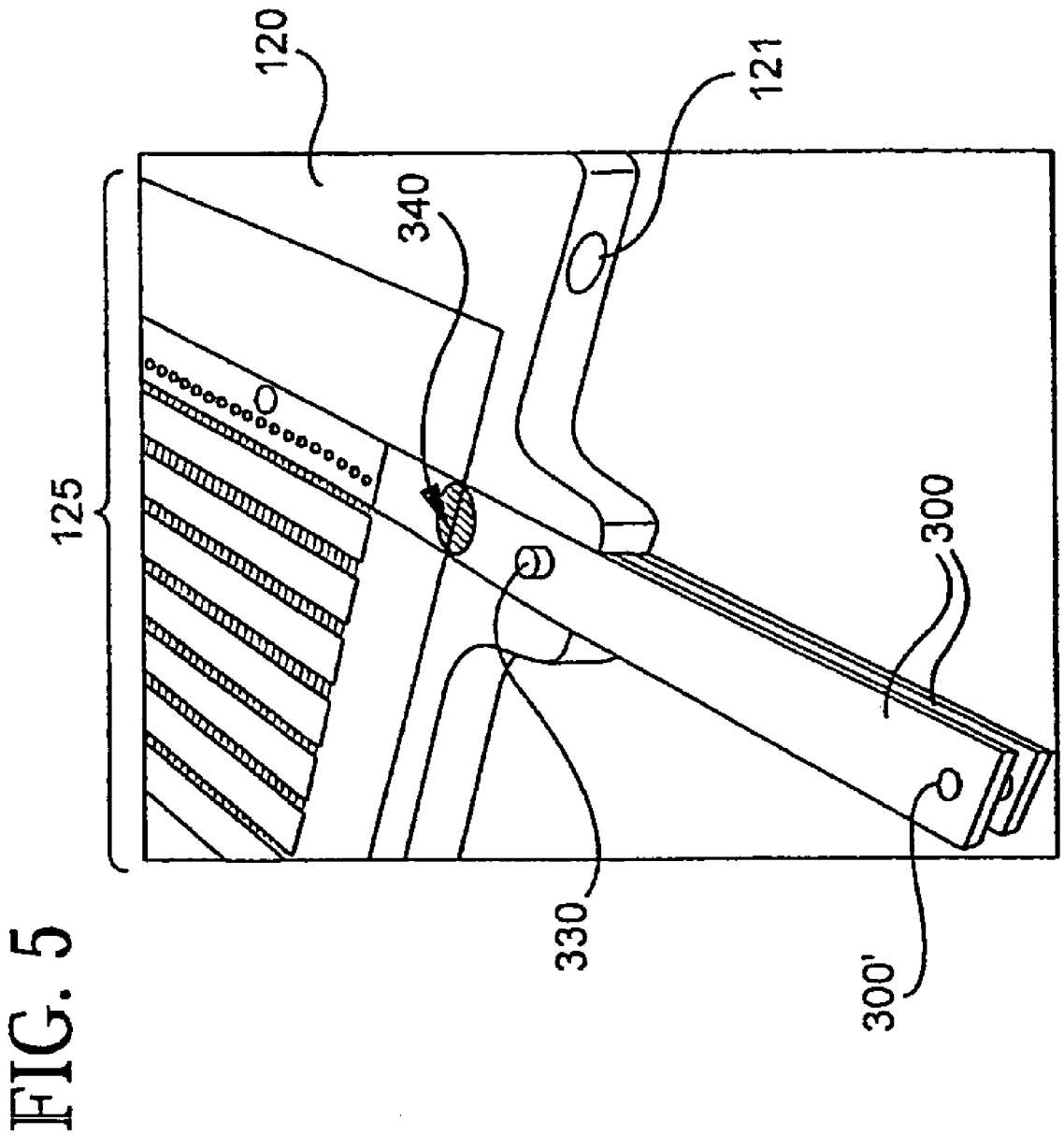
FIG. 5 illustrates an exemplary power/current lead takeoff assembly including a fuel cell array.

Electrical power is transferred from fuel cell packets 110 via electrically conductive power takeoff leads 300 (see FIGS. 2A and 5). Each packet 110 has a plurality of electrical leads 300. Each lead 300 is electrically connected to the fuel cell arrays 125 and is electrically isolated, for example via an insulating pad (not shown) from the fuel cell array framing members—i.e., packet frames 120. Connection between the external electrical coupler 320 to lead 300 may be achieved, for example, by a quick disconnect with male and female junctions (Shown in FIG. 1C) with outer covers of high temperature (preferably >100° C. and more preferably >150° C.) polymers. These polymers may be, for example, silicones or polyetherketones. Other types of electrical connections may be utilized. They are, for example: spring loaded clamp type clips; spring loaded contact-to-pad connection; male and female sliding interconnections; pin type male and female connections. Nuts and bolts may also be utilized to couple the cold end of the electrically conductive lead 300 to the electrical coupler 320 coming from the electrical load. This coupling is via bolt and nut may be achieved, for example, via a bolt situated through a lead hole 300' in the conductive lead 300 and a similar hole in the electrical coupler 320 (SOFC needs to be powered down first and at room temperature). This connection may then be secured by a bolt. Alternatively, high temperature brazes, silver solders, or silver brazes can be used to connect wire to the lead; solders and brazes can also couple the electrical coupler 320 to the conductive lead 300, as can battery-type clamps. Other electrically conductive junctions can also be used.

In the exemplary fuel cell stack assembly 100 each of the fuel cell packets 110 includes two electrolyte sheets 126 attached to the frame 120. The fuel cell arrays 125 are electrolyte supported fuel cell arrays. In these examples the fuel cell arrays 125 are comprised of an electrolyte sheet 126 with thickness of less than 45 μm, preferably less than 20 μm. The electrolyte sheet supports a plurality of anodes 127 on one side 125A of the electrolyte sheet and a plurality of cathodes 128 on another side 125B. The anodes 127 and cathodes 128 are interconnected via interconnects 129 (not shown) situated in via holes of the electrolyte sheet 126. It is preferable that the frame 120 have CTE close to that of electrolyte sheet 126, in order to minimize thermal stresses. If the electrolyte sheet 126 is made of partially stabilized zirconia (e.g., 3YSZ), it is preferable that the frame 120 has CTE (CTE=ΔL/LΔT) of about 9 to 13 ppm/° C. and preferably 10 to 12 ppm/° C.

A sealant 60 bonds the electrolyte sheet 126 to the frame 120. It is preferable that the sealant 60 be a hermetic sealant, for example a frit glass seal or a metal braze. Other hermetic sealants may also be used.

According to one embodiment of the present invention the frame 120 is a metal frame. According to another embodiment of the present invention the frame is a ceramic frame. According to one embodiment of the present invention the main enclosure is made of a metal alloy.

The packets 110 are loosely held in a single air (oxidant) chamber 155 common to all the packets. The air chamber 155 provides air or oxygen to the cathodes 128 to enable operation of the fuel cells. The fuel inlet and outlet manifolds 200, 210 and L-shaped endplates 152 provide physical support for the packets 110. The packets 110 may also contain alignment fixtures 120 with hole 120A, 120B, accepting for example, rods, bolts, and/or nuts, situated on packet frames 120 to provide for the desired spacing between the packets 110. Arraying the fuel packets within the oxidant chamber 155 divides the oxidant flow into multiple oxidant channels 160, separated from one another by packets 110. The cathode sides 125B of the fuel cell arrays of the adjacent packets 110 face one another to form side walls of the oxidant channels 160. As stated above, the fuel cell stack assembly 100 also includes a removable restrictor plate 170A forming, in conjunction with the main enclosure 150, the plurality of oxidant channels 160. In this embodiment, the restrictor plate 170A includes a plurality of slots 172 which are utilized to restrict and equalize air pressure within the oxidant channels 160.

Air flow rates and pressure drops are partially determined by the spacing of the fuel packets and are easily adjusted by modification of the endplate 152 design. The oxidant chamber 155 utilizes inlet and outlet plenum manifolds 180, 190 (respectively connected to the inlet and outlet sides of each of the oxidant channels 160) to assist in defining the final air flow rates and air pressure drops in the fuel cell stack assembly 100. The inlet plenum manifold 180 is designed in such a way as to even the air pressure and air flow within the plurality of oxidant channels 160. Plenum manifold designs can include restrictor plates. In the present embodiment the inlet plenum manifold 180 abuts the restrictor plate 170 containing flow restrictors 172 which are narrow slots or series of holes in the metal alloy sheet associated with the inlet of each oxidant channel 160, as shown in FIGS. 1A and 1B.

Figure 4B:
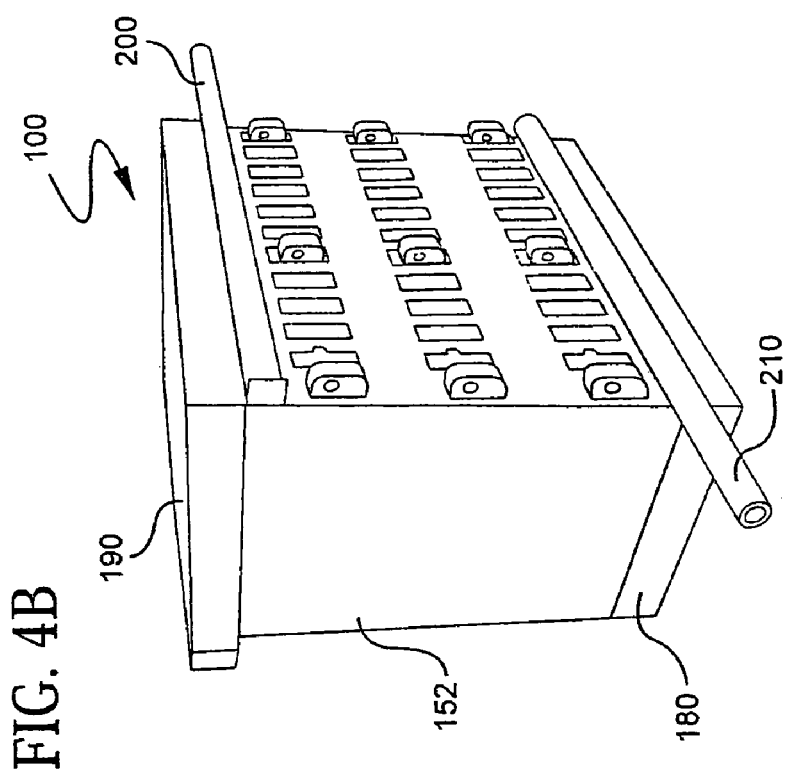
FIGS. 4A and 4B are two perspective views of the exemplary fuel cell stack.
Figure 4A:
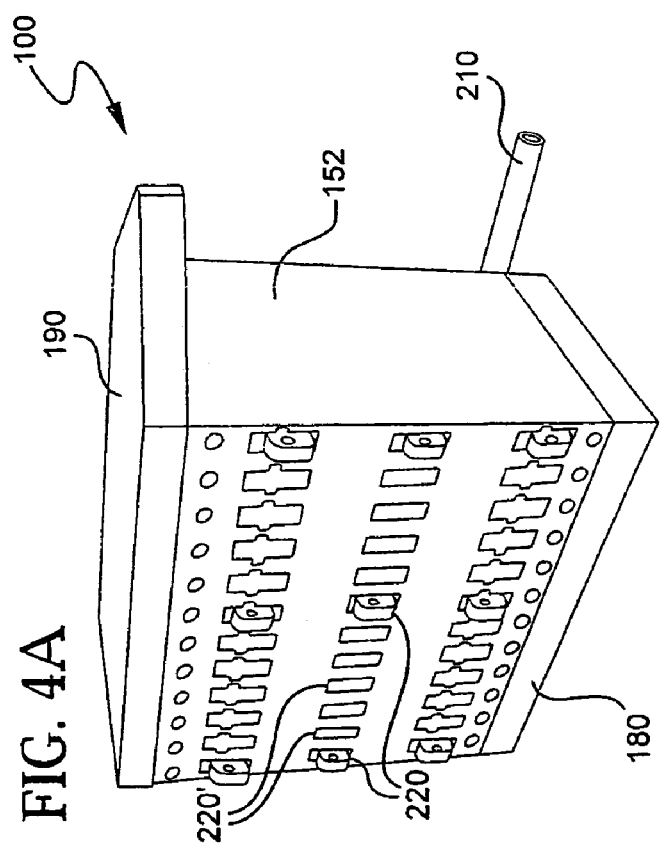

FIGS. 4A and 4B are two perspective views of the fuel cell stack assembly 100 including inlet and exhaust plenum manifolds 180 and 190, two L-shaped endplates 152, and main enclosure 150 including three fuel cell packets 110. FIG. 4A illustrates the L-shaped endplates 152 containing twelve sets of alignment slots 220' of the L-shaped endplates 152 for receiving the complimentary alignment fixtures 220 of the packet frames 120. Thus the L-shaped endplates 152 are capable of supporting 12 packets in the common oxidant (air) chamber 155. Three packets 110 are shown in FIG. 4A. The presentation of the packets 110 is indicated by the alignment fixtures 220 protruding through the alignment slots 220'. Air feed plenums (bottom) 180 and exhaust plenums (top) 190 are visible. Fuel inlet 200 is hidden and air inlet plenum manifold 180 is obscured, bottom. FIG. 4B depicts another perspective view of the fuel cell stack assembly 100 (with three packets inside) shown in FIG. 4A. This view shows fuel feed 200, fuel exhaust 210, air exhaust plenum 190, and the air inlet plenum 180 (obscured).

FIG. 5 illustrates an exemplary power/current lead takeoff assembly containing a packet frame 120, fuel cell array 125, electrically conductive leads 300, strain relief fasteners (one obscured) 330, and electrically conductive joining material 340. In this example the electrically conductive joining material serves two functions; electrical conductivity and mechanical adhesion between the lead materials and the pads communicating with either anodes or cathodes. The electrically conductive leads 300 are joined to electrically conductive structures (on the cathode or air channel side communicating with either anodes or cathodes) with electrically conductive material 340 (eg, Ag—Pd cermet). The electrically conductive leads 300 are also attached to the electrical insulator/spacer 310 using a strain relief fastener 330 and rod 320. The strain relief fastener 330 is attached to a rod 320 and provides strain relief for the electrically conductive lead 300 using a threaded (eg, nut & bolt) arrangement or joining adhesive (eg, cermet or glass).

Figure 6:
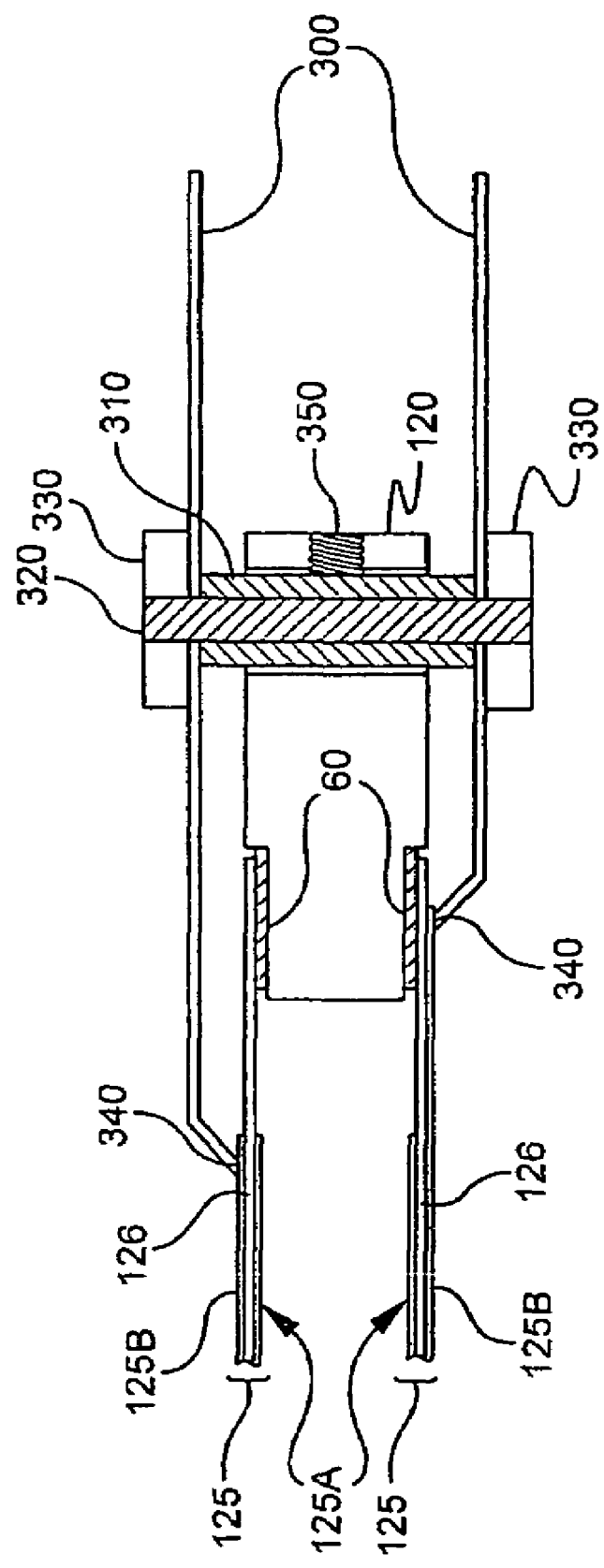
FIG. 6 is a cross-sectional schematic view of power/current lead takeoff shown in FIG. 5.

FIG. 6 is a cross-sectional schematic view of power/current lead takeoff shown in FIG. 5 containing a packet frame 120, two fuel cell arrays 125, electrically conductive leads 300, strain relief fasteners 330, ceramic insulator 310, joining material 350, and electrically conductive joining material 340. Electrically conductive leads 300 are joined to (i) electrically conductive structures (on the cathode or air channel side communicating with either anodes or cathodes) with electrically conductive material 340 (eg, Ag—Pd cermet) and to (ii) the electrical insulator/spacer using a strain relief fastener 330 and rod 320. The ceramic insulator 310 is fastened to the frame using a joining material (eg, glass frit). The strain relief fastener 330 may be attached to the rod and provide strain relief for the electrically conductive lead 300 using a threaded (eg, nut & bolt) arrangement or joining adhesive (eg, cermet or glass).

Referring to FIG. 6, in one embodiment the electrically conductive leads 300 are joined to electrically conductive structures extended into the portion of the fuel cell array 125 over the seal 60. This provides additional mechanical integrity to the electrical joint and material 340. Alternatively, the electrically conductive leads 300 are joined to electrically conductive structures located away from the fuel cell array 125 seal 60 area. Alternatively, the rod 320 may be made of conductive material (eg, stainless steel or Ag) thus making the electrical leads 300 electrically common.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A fuel cell stack assembly comprising:
   (i) a plurality of fuel cell packets, each packet comprising (a) a frame and (b) two planar electrolyte-supported fuel cell arrays, said arrays being arranged such that anode side of one fuel cell array faces the anode side of another fuel cell array and said frame in combination with said arrays defining a fuel chamber;
   (ii) a main enclosure enclosing said packets, such that the plurality of packets form a plurality of oxidant chambers;

(iii) a restrictor plate forming, in conjunction with said main enclosure, said plurality of oxidant chambers;

(iv) an inlet oxidant plenum manifold connected to one side of the oxidant chambers;

(v) an outlet oxidant plenum manifold connected to the other side of the oxidant chambers;

(vi) an inlet fuel manifold connected to one side of the fuel chambers; and (vii) an outlet fuel manifold connected to the other side of the fuel.

2. The fuel cell stack assembly according to claim 1 wherein said fuel cell arrays are electrolyte supported fuel cell arrays having electrolyte thickness of less than 45 μms thick.

3. The fuel cell stack assembly according to claim 1, wherein said frame is a metal frame.

4. The fuel cell stack assembly according to claim 1, wherein said frame is a ceramic frame.

5. The fuel cell stack assembly according to claim 1, wherein said main enclosure is made of a metal alloy.

6. The fuel cell stack assembly according to claim 1 wherein the packets are connected to the inlet oxidant plenum manifold and the outlet oxidant plenum manifold such that the oxidant flows directly from the inlet oxidant plenum manifold through the packets to the outlet oxidant plenum manifold.

7. The fuel cell stack assembly according to claim 1 wherein the packets contain electrical connections to the fuel cell arrays and said electrical connectors are electrically insulated from the fuel cell array framing members.

* * * * *